July 5, 1927.
F. R. MILLER
1,634,297
APPARATUS FOR PRINTING MOTION PICTURE FILMS
Original Filed April 25, 1919   2 Sheets-Sheet 1
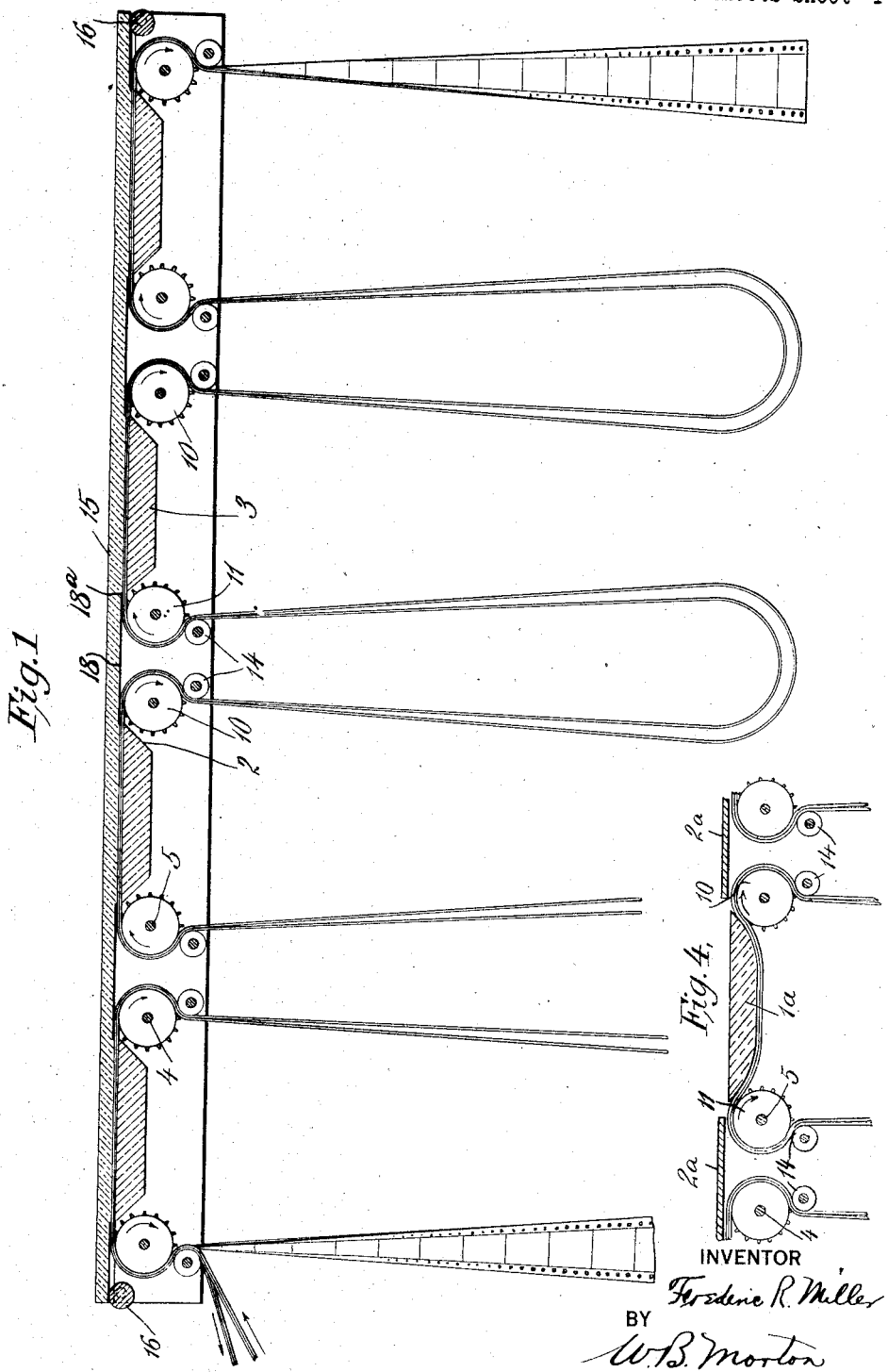
INVENTOR
Frederic R. Miller
BY
W. B. Morton
his ATTORNEY

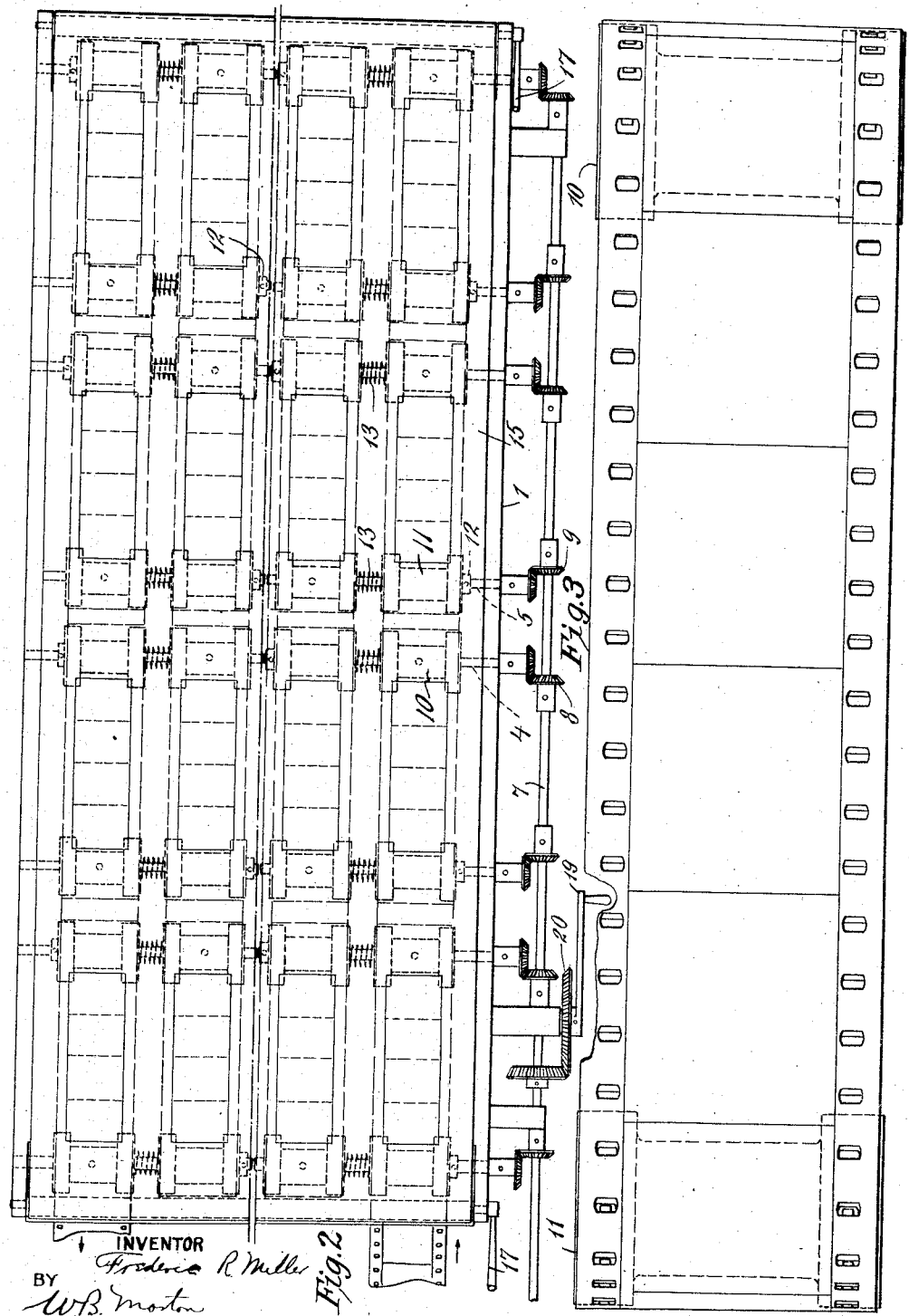

Patented July 5, 1927.

1,634,297

UNITED STATES PATENT OFFICE.

FREDERIC R. MILLER, OF JERSEY CITY, NEW JERSEY, ASSIGNOR TO ARTCOLOR MOTION PICTURE COMPANY, OF NEW YORK, N. Y., A CORPORATION OF ARIZONA.

APPARATUS FOR PRINTING MOTION-PICTURE FILMS.

Application filed April 25, 1919, Serial No. 292,525. Renewed November 24, 1926.

This invention relates to improvements in apparatus for printing moving picture films, and has for its object to provide an apparatus for printing films wherein a large number of individual pictures may be simultaneously printed at a single exposure, with the pictures accurately registered with relation to the sprocket holes in the margins of the film.

In printing motion picture films for use in a projecting apparatus it is necessary to expose the raw positive film through the previously developed master film, usually a negative, and thereafter develop the exposed positive and subject it to whatever further processes are necessary to produce the commercial positive film. The film used for both the master film and the film to be projected is supplied in its raw state with accurately spaced perforations along its margins, but the developing or further processing of the film causes a shrinkage in its length, so that if the original raw film is of the same length as the previously developed negative, and registers accurately with it throughout its length, the finished commercial film will be shorter than the negative and consequently will not be fed accurately, picture by picture, by the feed of the projecting machine. Instead, there will be a slightly excessive feed for each picture which causes the picture on the screen to "creep", that is, the whole picture appears to move either up or down, so that the operator must constantly correct the position of the picture with his framing mechanism. Also, the inaccuracy of the feed of the picture lessens the definition of the picture and if excessive, causes a blurred appearance which detracts from the exhibition.

It has been customary heretofore to print the pictures, one at a time, registering each portion of the raw film successively with a corresponding portion of the negative film so that the error from the shrinkage of the film, which is of course too minute in a single picture to be visible, will not be cumulative. Printing the pictures one by one, however, requires a great deal of time, due to the large number of individual pictures (sixteen to the foot) on a standard length of film, and it has therefore been the practice to use films having highly sensitive emulsions, so that the time of exposure of the individual pictures will be cut down to the smallest fraction of time. Even with film of this character, the time required for printing constitutes a very appreciable factor in the cost of the film.

By my invention, the time of printing is reduced to a small fraction of the time required by the machines now in use, and it is possible to commercially employ slow printing emulsions which are not only cheaper in cost than the high speed film heretofore necessary, but are capable of producing various effects not possible with the high speed film.

In the accompanying drawings I have shown a simple apparatus for carrying out my improved method of printing, the apparatus as shown being designed for hand operation, though it will of course be understood that in its commercial operation the machine will preferably be equipped with automatic driving mechanism for performing the several operations in proper sequence.

Referring to the drawings,

Fig. 1 is a vertical section through the machine showing the operation of the apparatus.

Fig. 2 is a plan view of the same;

Fig. 3 is a detail view showing the relation of the two films to the feed sprockets;

Fig. 4 is a detail showing a modification of the film-supporting surface.

Referring to the drawings, 1 indicates the table board of the machine which, as shown, is formed with a series of slots 2 in which the feed sprockets are supported, the slots alternating with film-supporting sections 3 which, as shown, are of a length substantially equal to the space required for four pictures on the film.

The table board is provided with a series of parallel rows of alternate slots and picture-supporting portions, the board being preferably square and of an area as large as can be properly lighted uniformly from the source of light.

At each row of slots 2 are provided two transverse shafts 4 and 5, respectively, upon which are supported the feed sprockets, the two shafts of each pair being preferably driven in unison in opposite directions by any suitable gearing. I have shown for the purpose a longitudinal main shaft 7 supported in brackets along the side of the table board 1 and carrying oppositely faced beveled pinions 8 and 9, respectively, meshing with corresponding pinions on the ends of the shafts 4 and 5.

Each alternate feed sprocket only is attached to its supporting shaft, the attached sprockets constituting the driving sprockets and each pair of sprockets consisting of one driving sprocket 10 and one hold-back, or tension, sprocket 11. The tension sprockets are loose on their respective shafts, and are preferably held lightly in place against displacement by means of collars 12 attached to the shaft and light springs 13 between the sprockets and the adjacent ends of the fixed sprocket. Each sprocket will be provided with the usual guide roller 14 for holding the film against the sprocket, the guide rollers being supported on swinging brackets in the customary manner to permit the film to be initially threaded into the machine.

Supported on the top of the table board 1 and covering the entire board is a heavy sheet of plate glass 15 which, during the time of exposure of the film, rests directly on the film to hold the negative and the raw film in close contact at the film-supporting sections of the table, but to prevent undue strain on the film. When the feed sprockets are operated the plate is slightly elevated to take its weight off the film. For this purpose I have shown an eccentric roller 16 at each end of the table, the rollers being provided with operating arms 17 which may be conveniently connected by a link or similar member (not shown) to secure simultaneous operation of the rollers. The partial turning of the roller 16 will elevate the glass sufficiently to relieve the film of its pressure. To prevent the exposure of the film over the sprockets the under side of the glass plate is provided with an opaque strip 18 of some suitable coating overlying the rows of sprockets, the edges of the strips being spaced apart a distance just equal to the length of the four pictures to be simultaneously printed at each film-supporting portion of he table. In order that the coating will not be smeared on the face of the film, the glass will be preferably grooved as indicated at 18$^a$ to receive the coating material, so that only the uncoated surface of the glass will actually contact with the film.

The driving shaft 7 may be operated by hand or through any suitable gearing by which it may be intermittently given one complete revolution at time intervals corresponding to the period of exposure which it is desired to give the film being printed. For the purpose of this application, I have shown a hand-crank 19 provided with a beveled gear 20 meshing with a beveled pinion 21 attached to the main shaft, so that each operation of the hand-crank will produce a complete rotation of the shaft.

The machine will also be provided with take-up reels, not shown, for the master film and the exposed raw film, the reels being driven in any preferred manner from one of the rotating shafts of the machine. Also supporting reels for the two films at the intake end of the machine may be provided to facilitate the feeding in of the film.

In using the apparatus I proceed as follows: The leading ends of the master film and the raw film are threaded over the driving sprocket 10 at the far front corner of the machine and held in engagement with the sprocket by guide roller 14, the glass plate, of course, being removed while the machine is threaded. The two films are then drawn back taut against the adjacent film-supporting section of the table and threaded over the tension sprocket 11 at the forward end of the slot 2. The guide roller 14 for this sprocket will be set against the sprocket and a length of film will be thrust down between the two sprockets in a loop of predetermined length, as shown in Fig. 1. The two films will then be caught on to the adjacent driving sprocket 10 at such point that the leading edge of one of the pictures on the master film coincides with the edge of the opaque strip covering the sprockets, with a definite number of pictures in the free loop between the front edge of the strip and the raw edge overlying the next driving sprocket. Another length of film of four pictures will then be drawn taut over the next film-supporting section 3, and threaded over the tension sprocket at the rear of that film-supporting section, and another loop formed containing the exact number of pictures between the edges of the strips as contained in the first loop.

The machine will be threaded throughout in this manner, the film passing from the tension sprocket 11 at the end of the first row in a loop to the driving sprocket 10 at the same end of the next row, so that the direction of feed of the film is reversed in the alternate rows.

As previously explained, the raw film is longer than the master film at the time of exposure, consequently the sprocket holes of the two films will register only at the leading end of the exposed surface of the film. The relation of the films is shown in Fig. 3, wherein the sprocket holes of the two films are shown in registration with the driving sprocket, due to the engagement of the forwardly moving edge of the sprocket tooth with the edges of the holes of both films. At the tension sprocket the holes in the two films will, however, not be in exact relation, but this sprocket will be turned by the pull of the shorter film only. In Fig. 3 the degree of difference between the lengths of the film is exaggerated in order to illustrate the operation of the device. In actual practice, the difference in a length of four pictures (that is, three inches) is not sufficient to be appreciable either on the screen in the projected picture or in the lost motion of the sprocket holes on the teeth. Hence, although the two lengths of film are held taut together and the printed pictures in the finally completed commercial film will be shorter than the pictures in the master film by the extent of the shrinkage, the error will be of no moment in this short length of film.

After the film is threaded up the glass plate will be lowered to hold the printed portions of the film in contact and the light will be turned on for the desired intervals of exposure. The operating arms 17 will then be shifted to slightly raise the glass and the crankarm 19 turned to rotate each of the shafts 4 and 5 a complete revolution. During the feeding operation the light may be cut off, but if the feed is performed with sufficient rapidity it will not be necessary.

The circumference of the driving sprockets is such that the complete rotation will feed forward the four pictures just exposed, bringing the leading edge of the first unexposed picture into line with the edge of the opaque strip on the glass. During this movement, while the two films are fed together, a little greater length of the raw film will, in fact, be fed, due to the fact that as each sprocket tooth enters the overlapped holes it will bring the edges of those holes into registration, thus taking up the slight overlap of the edges of the sprocket holes shown exaggerated in Fig. 3. Hence, while each individual picture of the successive sets of four to be printed is slightly smaller in its film after its shrinkage, each fourth picture will be separated from the leading picture of the next four by the same distance as the corresponding pictures in the master film, and the registration of the film with the feed mechanism of the projector will be to all practical purposes the same as if the pictures had been printed one by one in the present manner.

Each operation of the main shaft feeds forward four pictures to be printed at each of the several printing areas of the glass, and the entire film will be printed after a number of repeated operations of the machine equal to one-fourth of the number of pictures previously provided in the various loops of film. The loops of film will, of course, remain the same size throughout the operation of the machine, as each movement of the feed mechanism feeds a length of four pictures into the loop at one end, and takes up the length of four pictures at the other end.

After the entire length of film in the machine has been printed the feed handle will be operated continuously to feed the film out of the machine and on to the take-up reels. During the feeding operation the film will be held taut by the pull of the tension sprockets 11. It will be noted that each of these sprockets is supported on a shaft rotating in a direction opposite to that in which the film is drawn by the corresponding driving sprocket. Hence, the light friction imposed by the spring 13 will tend to drive the sprocket in the opposite direction and offer the desired resistance to the forward movement of the film.

In Fig. 4, I have shown a modification in the structure of the base plate which permits the cover plate to be dispensed with, and also approximately equalizes the length of the two films between the sprockets 10 and 11 so that the pictures are equally spaced in the film, instead of having the entire discrepancy for the four pictures taken up between each successive group of four. In the construction here shown, the base plate 1ª is formed of plate glass and has its under surface between each pair of sprockets cut on a convex curve, with the crown of the curve below the tops of the sprockets, so that the pull on the films draws the films taut against the curved surface, whereby the films will be held by their own tension in proper superimposed position for printing without further clamping means.

As the master film lies against the glass surface and the raw film on the outside, its path of movement will be slightly greater than that of the master film, thereby taking up to some extent the discrepancy in the lengths of the films.

The light for printing will be thrown on the upper surface of the glass and print through the glass, suitable cover strips 2ª being placed over the sprockets to cover the film thereon.

It will of course be understood that I have shown in the drawings only the essential elements of the apparatus for carrying my improved method into effect, and that in practical operation the machine will be provided with a stop motion designed to produce the desired number of successive intermittent rotations of the driving sprockets with a suitable printing interval between and will then drive the sprockets continuously to feed the film out of the machine, the glass plate being automatically raised just before each feeding movement is commenced, and restored to place at the close of the feeding movement.

It is also to be understood that the number of pictures printed at each exposure opening may be more or less than shown, and that the number of exposures simultaneously effected may be more or less, as desired.

In the drawings I have shown the machine arranged for a single film to go back and forth through the successive rows of feed sprockets, but it will of course be understood that I may instead print a separate reel at each row, in which case there will be a plurality of receiving reels at one end of the machine and supporting reels at the other, and the driving mechanism will be arranged to operate the sprockets intermittently a sufficient number of times to print all the pictures in the loops between the successive sprockets and will then be operated continuously a predetermined interval with the printing light cut off to feed all the exposed film out of the machine and re-establish a fresh set of loops of unexposed film.

I may also arrange the machine to feed a single film through the successive rows but in the same direction in each row by having the loop from the sprocket at one edge of the table extend back to the feed sprocket of the next row of openings at the other end of the table. The path of the film may obviously be otherwise modified as desired.

Instead of employing sprockets to maintain the film at the printing position under tension, a smooth guide roller may obviously be employed with a suitable tension device on the film, and with the smooth roller I may also employ edge guides for the film of any improved type, such, for instance, as now in use for motion picture projecting machines.

I claim:

1. In a machine for printing motion picture films, the combination of a plurality of sprockets arranged in successive rows with several sprockets in each row, means for simultaneously operating the sprockets to an equal extent, an exposure window adjacent each sprocket of a length equal to a length of film fed at each operation of the sprockets, and means for supporting the film to be printed and the master film in loops of equal length between each successive sprocket of the row and the end sprockets of the adjacent rows.

2. In a machine for printing motion picture films, the combination of a plurality of sprockets arranged in successive rows with several sprockets in each row, means for simultaneously operating the sprockets to an equal extent, an exposure window adjacent each sprocket of a length equal to a length of film fed at each operation of the sprockets, means for supporting the film to be printed and the master film in loops of equal length between each successive sprocket of the row and the end sprockets of the adjacent row, and means at each exposure window for maintaining the films under tension and in proper superimposed position for printing.

3. In a machine for printing motion picture films, the combination of a base-board having a plurality of rows of film-supporting sections, said sections being arranged in transverse rows, a pair of sprockets between each feed section in the row, one of said sprockets of each pair being a driving sprocket, and means for lightly holding the other sprocket of each pair against rotation in the direction of feed movement of the film which operates it.

4. In a machine for printing motion picture films, the combination of a base-board having a plurality of rows of film-supporting sections, said sections being arranged in rows transversely of the board, a pair of shafts extending transversely of the board between each row of sections, a pair of sprockets supported on said shafts respectively between each two sections of each row, one sprocket of each pair being attached to its shaft, and means for simultaneously rotating all the shafts with the shafts of each pair rotating in opposite directions.

5. In a machine for printing motion picture films the combination of a base-board having a plurality of rows of film-supporting sections, a plurality of feed sprockets arranged one adjacent each section, with the feed sprockets for all the sections in one row at the same end of each section and the sprockets for the feed section in the next row at the opposite ends of the respective sections, whereby the films will be advanced in one direction by the sprockets of one row and in the opposite direction by the sprockets of the adjacent row, means for moving the sprockets, a cover for said base-board having a plurality of exposure openings corresponding to the length of film to be exposed at each section, said length being substantially greater than the height of one picture, and intermediate opaque portions to cover the film between the sections.

6. In a machine for printing motion picture films, the combination of a base-board having a plurality of rows of film-supporting sections, a plurality of feed sprockets arranged one adjacent each section, with the feed sprockets for all the sections in one row at the same end of each section and the sprockets for the feed section in the next row at the opposite ends of the respective sections, whereby the films will be advanced in one direction by the sprockets of one row and in the opposite direction by the sprockets of the adjacent row, means for moving the sprockets, a cover for said base-board having a plurality of exposure openings corresponding to the length of film to be exposed at each section, said length being substantially greater than the height of a single picture, and intermediate opaque portions to cover the film between the sections, and means for operating all said sprockets in unison at intervals and means operated in advance of said feed means to raise said cover out of engagement with the film during the feeding operation.

Signed at New York city in the county of New York and State of New York, this 21 day of April, 1919.

FREDERIC R. MILLER.